US008352151B2

United States Patent
Okinaka et al.

(10) Patent No.: US 8,352,151 B2
(45) Date of Patent: Jan. 8, 2013

(54) ELECTRIC CURRENT SUPPLY CONTROL APPARATUS FOR GLOW PLUG, AND GLOW PLUG AND ELECTRIC CURRENT SUPPLY APPARATUS CONNECTED TO THE GLOW PLUG

(75) Inventors: Manabu Okinaka, Kani (JP); Toshiyuki Nakamura, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 427 days.

(21) Appl. No.: 12/779,629

(22) Filed: May 13, 2010

(65) Prior Publication Data

US 2010/0292908 A1    Nov. 18, 2010

(30) Foreign Application Priority Data

May 14, 2009   (JP) ................................. 2009-117811

(51) Int. Cl.
*F02P 19/02* (2006.01)
*F02P 19/00* (2006.01)
(52) U.S. Cl. ..................................... 701/102; 123/179.6
(58) Field of Classification Search .................. 701/102, 701/103, 108; 123/179.6, 145 A, 143 A, 123/143 B, 568.11
See application file for complete search history.

(56) References Cited

U.S. PATENT DOCUMENTS

2008/0032777 A1    2/2008   Okada
2009/0255499 A1*   10/2009  Sasaki et al. .............. 123/145 A

FOREIGN PATENT DOCUMENTS

| JP | 2005-240707 A | 9/2005 |
| JP | 2008-089233 A | 4/2008 |
| JP | 2008-196311 A | 8/2008 |
| JP | 2009-046996 A | 3/2009 |

* cited by examiner

*Primary Examiner* — Mahmoud Gimie
(74) *Attorney, Agent, or Firm* — Sughrue Mion, PLLC (57) ABSTRACT

An electric current supply control apparatus for a glow plug, and glow plug and the electric current supply control apparatus connected to the glow plug. In a transition state in which the load acting on an engine increases such as at the time of acceleration (S14:YES), an instruction signal which instructs increasing of an EGR amount is transmitted to an ECU (S18). Further, electric current is supplied to a heat generation resistor of a glow plug through resistance PI control (S20), whereby the temperature of the heat generation resistor is stably maintained at a target temperature, and stability of combustion is enhanced. Thus, even at the time of acceleration, generation of $NO_X$ can be suppressed effectively by increasing the EGR amount without lowering the engine output.

7 Claims, 5 Drawing Sheets

ELECTRIC CURRENT SUPPLY CONTROL APPARATUS FOR GLOW PLUG, AND GLOW PLUG AND ELECTRIC CURRENT SUPPLY APPARATUS CONNECTED TO THE GLOW PLUG

BACKGROUND OF THE INVENTION

1. Field of the Invention

The present invention relates to an electric current supply control apparatus for a glow plug which controls the supply of electric current to a heat generation resistor of a glow plug mounted to an engine, and to a glow plug and electric current supply control apparatus connected to the glow plug.

2. Description of the Related Art

Conventionally, a technique has been known called exhaust gas recirculation (hereinafter, also referred to as "EGR") in which exhaust gas discharged from an engine of an automobile is partially returned to the intake side and reintroduced into the engine. When EGR is performed, the concentration of oxygen within air taken into the engine decreases, whereby combustion of fuel becomes less explosive. In addition, in the intake air, the concentration of carbon dioxide, which has a higher heat capacity than oxygen, increases. Thus, an increase in combustion temperature is suppressed. As a result, the production of nitrogen oxide ($NO_X$) is suppressed, and the concentration of $NO_X$ within the exhaust gas can be reduced.

Figure 6:
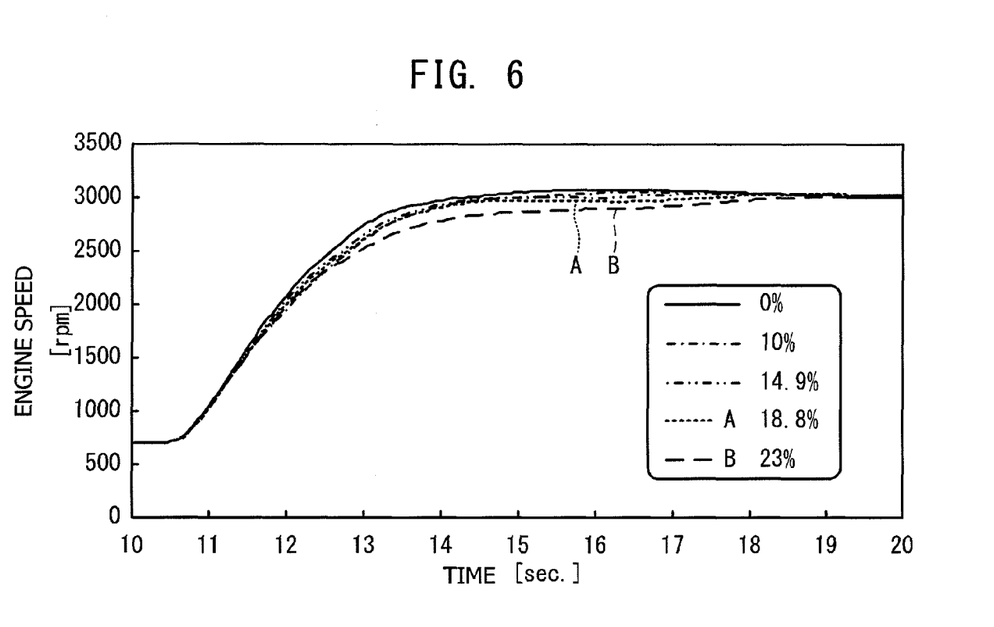
FIG. 6 is a graph showing how engine speed as a function of time changes depending on the EGR amount.

Meanwhile, when an EGR amount is increased, the temperature of the intake air decreases, and the oxygen concentration also decreases. As a result, combustion of fuel becomes unstable, which may cause a reduction in engine output or a misfire. The EGR amount refers to an amount of recirculation of exhaust gas. In some cases, the EGR amount refers to a ratio of the amount of exhaust gas circulated from a circulating passage to the amount of exhaust gas discharged from the engine. However, when the EGR amount is represented by a ratio (%) in relation to the present invention, it represents a ratio of the amount of circulated exhaust gas (hereinafter referred to as EGR gas) to the amount of a mixture of atmospheric air and EGR gas introduced into a cylinder of the engine. This ratio can be obtained from $CO_2$ concentration through calculation $\{(CO_2$ within EGR gas within intake gas)$-(CO_2$ within atmospheric air)$\}/\{(CO_2$ within exhaust gas)$-(CO_2$ within atmospheric air)$\}$. FIG. 6 shows a specific example of the above-mentioned phenomenon. In a test for investigating such a phenomenon, an engine for testing was used, and the engine speed was sharply increased from an idling state (about 700 rpm) with an accelerator pedal fully depressed. The solid line shows the increase in engine speed as a function of time for the case where EGR was not performed (EGR amount: 0%). Further, the single-dot chain line shows the increase in engine speed for the case where the EGR amount was set to 10% under the same conditions; and the two-dot chain line shows the increase in engine speed for the case where the EGR amount was set to 14.9%. Further, the broken line A shows the increase in engine speed for the case where the EGR amount was set to 18.8%, and the broken line B shows the increase in the engine speed for the case where the EGR amount was set to 23%. The results of this test also reveal that, irrespective of the EGR amount, the engine speed became saturated at about 3000 rpm, and no difference was observed in terms of the maximum speed of the engine. However, the results of this test reveal that, the greater the EGR amount, the longer the time required by the engine to increase its speed from about 700 rpm to about 3000 rpm. That is, the results of this test show that, when the EGR amount is increased, torque decreases.

Incidentally, when an engine has not yet warmed sufficiently, such as at the time of cold startup of the engine or immediately after startup, a glow plug is used to assist in the startup or to allow for stable operation. In such a case, since the intake air temperature is low, a reduction in $NO_X$ can be expected. As is known, the temperature of a glow plug is desirably set to 1100° C. or higher in order to reduce $NO_X$ while securing ignition performance (see, for example, Patent Document 1). Further, although the EGR amount desirably is increased so as to further reduce $NO_X$, the increased EGR amount makes combustion unstable. In order to overcome such a drawback, a technique has been proposed in which, at the time of cold start of an engine when electric current is supplied to a glow plug, the EGR amount is increased so as to more reliably suppress the generation of $NO_X$ (for example, see Patent Document 2).

Figure 7:
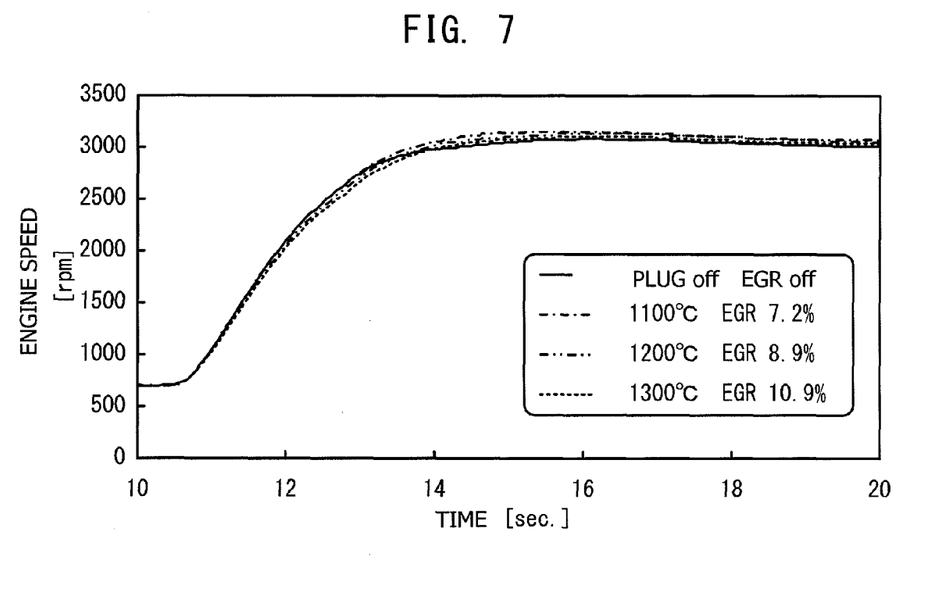
FIG. 7 is a graph showing, for comparison, the change in engine speed for two cases where (i) the target temperature of the heat generation resistor and (ii) the EGR amount are each adjusted such that the engine speed as a function of time is similarly increased for both cases.

The present inventors found that, not only when an engine is cold-started but also when the load acting on the engine increases at the time of acceleration or the like, the engine can be operated stably by supplying electric current to a glow plug. FIG. 7 specifically shows the results of a test. In this test, the above same engine for testing was used, and the engine was accelerated from an idling state (about 700 rpm) with the accelerator pedal fully depressed. The solid line shows an increase in engine speed as a function of time for the case where EGR was not performed (EGR amount: 0%), and this increase in engine speed was used as a reference. The glow plug was heated to 1100° C., and the test was performed while the EGR amount was adequately changed. The changed EGR amount was recorded when an increase in engine speed as a function of time approximately the same as the reference was attained (i.e., when the time required to increase the engine speed from about 700 rpm to about 3000 rpm and the maximum engine speed became approximately the same as those in the case of the reference) as indicated by a single-dot chain. The recorded EGR amount was 7.2%. Similarly, the test was performed while the glow plug was heated to 1200° C. and 1300° C., and the changed EGR amount was recorded when an increase in engine speed as a function of time approximately the same as the reference was attained (indicated by a two-dot chain line and a broken line, respectively). The recorded EGR amounts were 8.9% and 10.9%, respectively. The results of this test reveal that, even in a situation where the load imposed on the engine increases such as at the time of acceleration, if the glow plug is heated to thereby increase its temperature, combustion can be made more stable, whereby the EGR amount can be increased without reducing the output of the engine.

[Patent Document 1] Japanese Patent Application Laid-Open (kokai) No. 2008-89233
[Patent Document 2] Japanese Patent Application Laid-Open (kokai) No. 2008-196311

3. Problems to be Solved by the Invention

Figure 8:
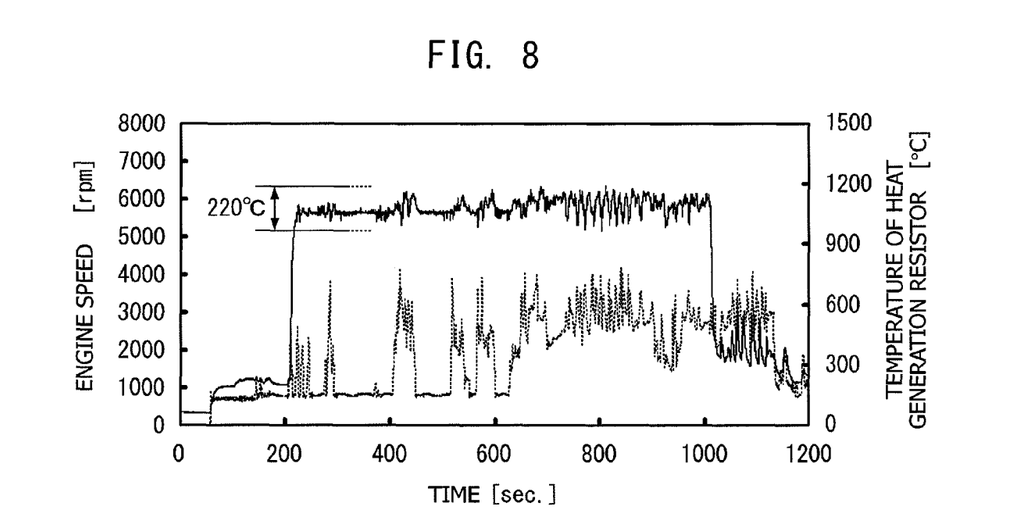
FIG. 8 is a graph showing a state in which the heat generation resistor is influenced by swirl or the like when electric current is supplied to the heat generation resistor, and the temperature of the heat generation resistor changes with a change in engine speed.

When the accelerator pedal of an automobile is depressed, since the amount of injected fuel increases, a rich atmosphere tends to be created, and an increase or decrease (change) in the $NO_X$ generation amount may become large. In order to reduce $NO_X$, preferably, the EGR amount is increased as much as possible. However, when the speed of an engine increases, a glow plug attached to the engine becomes susceptible to an influence of swirl produced within the engine or the like, and its temperature is apt to change and become unstable. Specifically, when the load imposed on the engine increases sharply as shown in FIG. 8 (when the engine speed increases within a short period of time), the temperature of the glow plug also changes greatly. In this example, the temperature of the glow plug changes within a range of about 220° C. When the temperature of the glow plug temporarily decreases because of influence of swirl or the like, torque may be reduced and drivability may be impaired unless the EGR amount is proper. In order to optimize the EGR amount, the temperature of the glow plug at the time of acceleration is desirably stabilized. However, the heat generation state of the glow plug and the state of generation of swirl within the engine vary among automobiles. Accordingly, unless the relationship between the temperature of the glow plug and increase in engine speed as a function of time is determined for each engine through mapping, stabilization of the temperature of the glow plug is difficult. In addition, mapping increases cost. Therefore, conventionally, priority is given to securing drivability, and EGR, which may cause a reduction in torque, is not performed at the time of acceleration.

The present invention has been accomplished in order to solve the above-described problems, and an object of the present invention is to provide an electric current supply control apparatus for a glow plug which can supply electric current to the glow plug when a load imposed on an engine is in a transition state, to thereby enable the circulating amount of exhaust gas to increase. Another object of the present invention is to provide a glow plug which is connected to the electric current supply control apparatus and whose energization state is thereby controlled.

SUMMARY OF THE INVENTION

According to a first mode, the present invention provides an electric current supply control apparatus for a glow plug, the electric current supply control apparatus being connected to an external apparatus which controls a circulation valve provided in a circulating passage connecting an intake passage and an exhaust passage of an engine so as to adjust an amount of exhaust gas circulated to the intake side, the circulated exhaust gas being a portion of exhaust gas discharged from the engine. The electric current supply control apparatus is adapted to control the supply of electric current to a heat generation resistor of the glow plug, which glow plug is mounted to the engine. The electric current supply control apparatus comprises transition determination means, operable after startup of the engine, for determining whether or not the load acting on the engine is in a transition state in which the load is increasing, on the basis of information obtained from the external apparatus and regarding an operation state of the engine; electric current supply means for supplying electric current to the heat generation resistor when the load acting on the engine is determined to be in the transition state; and output means for outputting to the external apparatus, synchronously with the supply of electric current to the heat generation resistor, a report signal which reports that the circulating amount of the exhaust gas can be increased.

In the first mode, in a transition state, such as an accelerating state, in which the load acting on the engine increasing, electric current can be supplied to the heat generation resistor in order to enhance stability of combustion, and a report signal can be output to the external apparatus so as to increase the circulating amount of exhaust gas. That is, a reduction in combustion stability, which may occur as a result of an operation of increasing the circulating amount of exhaust gas, is suppressed by supplying electric current to the heat generation resistor, whereby maintenance of engine output and purification of exhaust gas can be realized at the same time. Thus, the circulating amount of exhaust gas can be increased in a transition state without impairing drivability, whereby generation of $NO_X$ can be suppressed more reliably as compared with conventional techniques.

Further, preferably, the electric current supply control apparatus according to the first mode comprises acquisition means for acquiring the resistance of the heat generation resistor when the electric current supply means supplies electric current to the heat generation resistor. The electric current supply means controls the amount of electric current supplied to the heat generation resistor such that the acquired resistance coincides with a target resistance corresponding to a temperature to which the temperature of the heat generation resistor is to rise. In a transition state, since the amount of gas taken into a combustion chamber of the engine and the amount of gas exhausted from the combustion chamber can change greatly, the temperature of the heat generation resistor is apt to change considerably because of swirl or the like. Further, the upper limit of the circulating amount of exhaust gas, below which exhaust gas can be circulated without reducing engine output, changes depending on the temperature of the heat generation resistor. In the first mode, the amount of electric current supplied to the heat generation resistor can be controlled such that the resistance of the heat generation resistor coincides with a target resistance. Consequently, the temperature of the heat generation resistor can be readily stabilized without having to map the relationship between the temperature of the heat generation resistor and parameters such as engine speed in the transition state. Thus, it is possible to suppress generation of $NO_X$ sufficiently and reliably in the transition state, without finely adjusting the circulating amount of exhaust gas.

Further, in the electric current supply control apparatus according to the first mode, the report signal may contain information regarding an increase in the circulating amount, which increase corresponds to the temperature to which the temperature of the heat generation resistor is to rise. In the first mode, the report signal to be output to the external apparatus is prepared so as to contain information regarding an increase in the circulating amount. Therefore, the report signal can report not only establishment of a state where the circulating amount can be increased, but also an amount by which the circulating amount can be increased. Therefore, it is sufficient for the external apparatus to perform processing of increasing the circulating amount of exhaust gas in accordance with the information contained in the report signal transmitted from the electric current supply control apparatus and which represents an increase in the circulating amount. Accordingly, it is possible to constitute a system which can readily purify exhaust gas even at the time of acceleration, without incorporating therein a complicated computation circuit for calculating the increase in the circulating amount.

Further, the electric current supply control apparatus according to the first mode further comprises sudden-change determination means, operable when the load acting on the engine is in the transition state, for determining whether or not the load acting on the engine is in a sudden-change state in which the load acting on the engine increases at a speed greater than a predetermined speed. The supply of electric current to the heat generation resistor by the electric current supply means and the output of the report signal by the output means are performed, when the load acting on the engine is determined to be in the sudden-change state. Even in the transition state, when an increase in the load acting on the engine is relatively small, in some cases, generation of $NO_X$ can be suppressed sufficiently by circulating exhaust gas in an amount similar to that circulating during non-accelerating periods. Accordingly, even in the case where the circulating amount of exhaust gas is increased only when the load is determined to be in a sudden-change state, which is one type of transition state, maintenance of engine output and purification of exhaust gas can be realized at the same time.

Further, in the electric current supply control apparatus according to the first mode, the electric current supply means may supply electric current to the heat generation resistor such that the temperature of the heat generation resistor becomes 1200° C. or higher. In the case where the temperature of the heat generation resistor is increased, the output of the engine can be maintained sufficiently even when a larger amount of exhaust gas is circulated in order to suppress generation of $NO_X$. In particular, in the case where the temperature of the heat generation resistor is increased to 1200° C. or higher, it becomes possible to more effectively increase the circulation amount of exhaust gas, while maintaining the engine output.

According to a second mode, the present invention provides a glow plug and electric current supply control apparatus according to the first mode connected to the glow plug, the energization state of the glow plug being controlled by the electric current supply control apparatus, wherein a relationship $Y/X \leq 0.6$ is satisfied, where X represents a time required by the engine to increase its speed from a first engine speed at the time of idling to a second engine speed greater than the first engine speed, and Y represents a time required by the heat generation resistor to increase its temperature from a first temperature, to which the heat generation resistor is heated by heat received from the engine when the engine is in an idling state and no electric current is supplied to the heat generation resistor, to a second temperature which is higher than the first temperature and to which the heat generation resistor is to rise. The larger the value of Y/X, the lower the limit under which the circulating amount of exhaust gas can be increased, while the engine output is maintained, and the greater the difficulty in effectively suppressing generation of $NO_X$. When the value of Y/X is equal to or less than 0.6, as compared to a value of Y/X of greater than 0.6, the temperature rising speed of the heat generation resistor and the rising engine speed can be well balanced, whereby generation of $NO_X$ can be sufficiently suppressed.

In the glow plug and electric current supply apparatus according to the second mode, when the second temperature of the heat generation resistor is set to 1200° C., a relationship $0.5 \leq Y \leq 3.0$ (sec) may be satisfied. If the temperature of the heat generation resistor can be quickly increased, the load acting on the engine is suppressed even when the circulating amount (EGR amount) of exhaust gas is increased. When the temperature rising time is equal to or less than 3.0 sec, generation of $NO_X$ can be effectively suppressed. The value of Y is desirably set to as small a value as possible. However, when Y is less than 0.5 sec, it is necessary to provide a heat generation resistor which allows for quick rise in temperature by increasing the amount of electric power supplied to the heat generation resistor per unit time and/or by employing an expensive material, which may result in an increase in production cost.

DESCRIPTION OF REFERENCE NUMERALS

Reference numerals used to identify various structural features in the drawings include the following.
- 10: engine
- 20: glow plug
- 21: heat generation resistor
- 30: GCU
- 40: ECU
- 50: intake passage
- 60: exhaust passage
- 70: circulating passage
- 72: EGR throttle

DETAILED DESCRIPTION OF THE PREFERRED EMBODIMENTS

An embodiment of an electric current supply control apparatus for a glow plug according to the present invention will now be described with reference to the drawings. However, the present invention should not be construed as being limited thereto. In the present embodiment, a glow plug 20, which is used to assist startup of an automotive diesel engine (hereinafter, also referred to as an "engine") 10 and improve stability of its operation, is taken as an example glow plug. Further, the embodiment will be described, while a glow control unit (GCU) 30, which controls the supply of electric current to the glow plug, is taken as an example electric current supply control apparatus.

Figure 1:
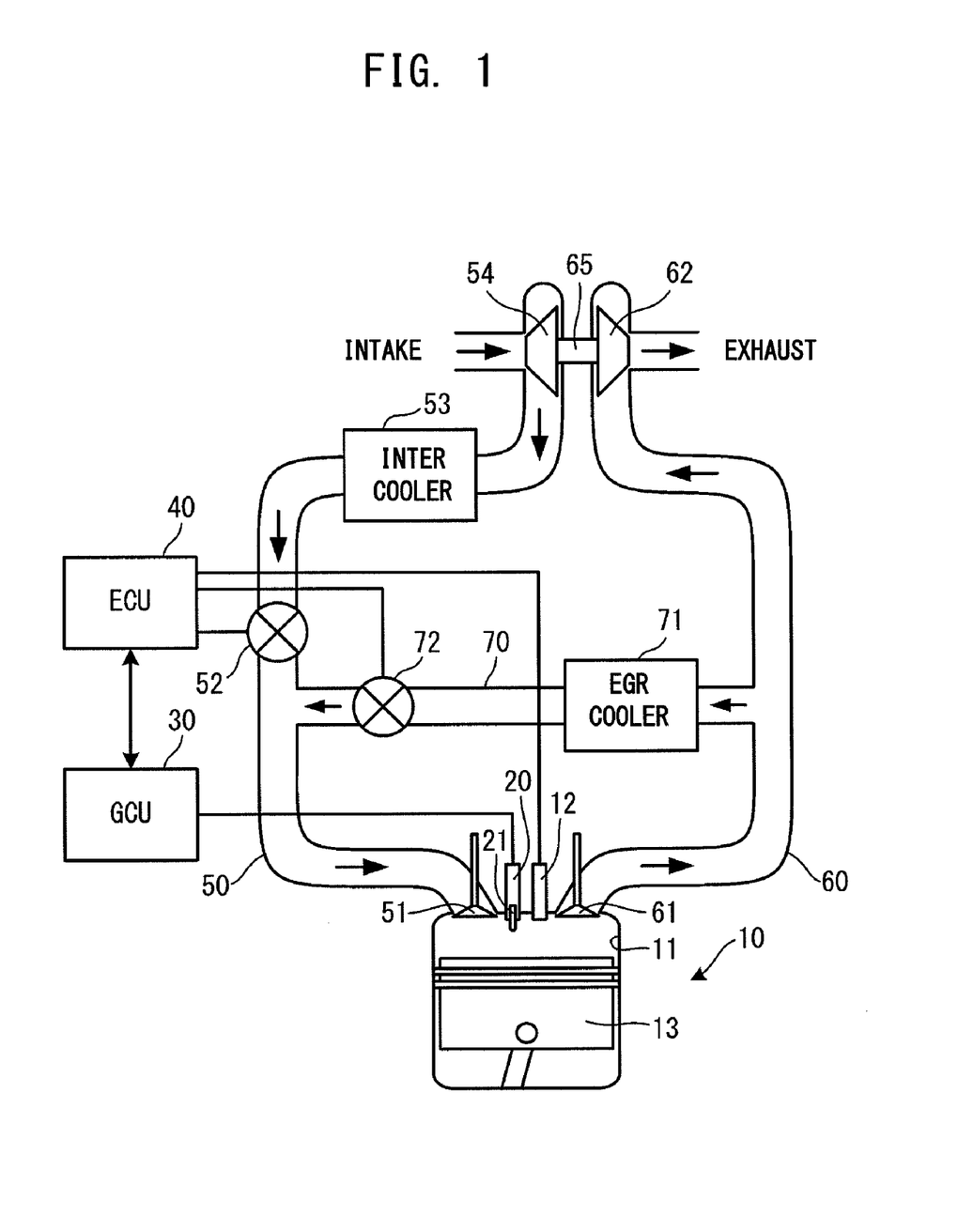
FIG. 1 is a diagram which schematically shows the configuration of an intake-exhaust system of an engine 10.

The GCU 30 shown in FIG. 1 is an apparatus for controlling the supply of electric current to the glow plug 20, and operates upon receipt of electric power from an unillustrated battery. The GCU 30 includes a known CPU, EEPROM, and RAM (not shown), and controls the supply of electric current to the glow plug 20 in accordance with various programs executed by the CPU. The GCU 30 is connected to a known electronic control unit (ECU) 40 of an automobile through communications performed by use of a CAN (control area network). The ECU 40 corresponds to the "external apparatus" of the present invention.

In FIG. 1, the engine 10 is depicted as having a single cylinder 11, and a single glow plug 20 whose energization is controlled by the GCU 30 and is mounted to the cylinder 11. However, a plurality of cylinders are provided in an actual engine, and a plurality of glow plugs which are equal in number to the cylinders are provided. Further, a plurality of electric current supply circuits which correspond to the plurality of glow plugs are provided within the GCU 30. Although the GCU 30 performs electric current supply control for the glow plugs independently of one another, the control method is the same among the glow plugs. Therefore, in the description of the present embodiment, the electric current supply control which is performed for a certain glow plug 20 by the GCU 30 will be described.

An intake passage 50 and an exhaust passage 60 are connected to the cylinder 11 of the engine 10, and communicate with the interior of the cylinder 11 when an intake valve 51 and an exhaust valve 61 are opened, respectively. The above-mentioned glow plug 20 and an injector 12 are attached to the cylinder 11. The injector 12 receives pressurized fuel supplied via an unillustrated fuel pipe, and injects the fuel into the cylinder 11 when an electromagnetic valve thereof opens. The injector 12 is connected to the ECU 40, and injection timing is controlled by the ECU 40.

The glow plug 20 is a so-called ceramic glow plug in which a heat generation resistor 21 is formed through a process of providing a heat generation pattern on a substrate made of insulating ceramic using a high-melting-point material such as tungsten or molybdenum, followed by firing. A ceramic glow plug is preferable from the viewpoint of use in a high temperature range (e.g., the case where the heat generation temperature is set to 1200° C. or higher). However, if durability, including heat resistance, can be secured, a so-called metal glow plug may be used, in which a heat generation resistor formed of an Fe—Cr alloy or an Ni—Cr alloy is disposed within a sheath. In the present embodiment, the heat generation resistor 21 has a positive correlation between temperature and resistance so that its resistance increases with its own temperature (in other words, the resistance of the heat generation resistor 21 has a positive temperature coefficient). A metal glow plug may be used so long as its heat generation resistor has a positive correlation between temperature and resistance as in the case of the above-mentioned ceramic glow plug. Since the glow plug is known, the details thereof will not be described.

An intake throttle 52 is provided in the intake passage 50, and an intercooler 53 is provided upstream of the intake throttle 52. Further, a compressor 54 is provided upstream of the intercooler 53. The compressor 54 compresses air taken into the compressor, and the intercooler 53 cools air which has expanded due to compression heat to thereby increase the compressed density.

A turbine 62 is provided in the exhaust passage 60, and is connected to the intake-side compressor 54 via a shaft 65. When the turbine 62 is driven by exhaust gas flowing through the exhaust passage 60, the compressor 54 is driven, whereby air flowing through the intake passage 50 is compressed.

A circulating passage 70 is provided between the intake passage 50 and the exhaust passage 60. The circulating passage 70 forms a flow passage through which a portion of exhaust gas flowing through the exhaust passage 60 flows toward the intake passage 50 side for recirculation. An EGR cooler 71 is provided on the upstream side (the side toward the exhaust passage 60) of the circulating passage 70 in order to cool exhaust gas which is introduced from the exhaust passage 60 into the circulating passage 70. Further, an EGR throttle 72 is provided on the downstream side of the circulating passage 70. The ECU 40 controls the opening (%) of the EGR throttle 72, to thereby adjust the EGR amount. Notably, when the EGR amount is adjusted, the opening of the intake throttle 52 is also changed, whereby the ratio between the amount of EGR gas and atmospheric air within a gas mixture introduced into the cylinder 11 is adjusted. The EGR throttle 72 corresponds to the "circulation valve" of the present invention.

In the engine 10 configured as described above, air flowing through the intake passage 50 is introduced into the cylinder 11 via the intake valve 51, and is compressed by a piston 13. When the air is heated to a high temperature by means of compression heat, the injector 12 injects fuel in an amount corresponding to a depressed amount of an accelerator pedal (not shown). The heated air mixes with the fuel, and the resultant gas mixture ignites. Due to combustion pressure produced as a result of explosion, the piston 13 is driven, whereby power is generated. At the time of cold start, since the engine 10 has not been warmed sufficiently, the ignition becomes unstable. Therefore, electric current is supplied to the glow plug 20, whereby the heat generation resistor 21 generates heat to thereby stabilize the ignition. Exhaust gas produced as a result of combustion is discharged to the exhaust passage 60 via the exhaust valve 61, and flows through the exhaust passage 60, while driving the turbine 62. The exhaust gas is then discharged to the outside of the vehicle via an unillustrated purifier. Meanwhile, the turbine 62 drives the compressor 54 via the shaft 65, to thereby compress fresh air introduced to the intake passage 50. Although the compressed air becomes hot and its density decreases due to expansion, the air is cooled when passing through the intercooler 53, whereby the density of the air is increased. When the intake throttle 52 is opened, the air is introduced into the cylinder 11 via the intake valve 51. At that time, a portion of the exhaust gas is mixed with the air via the circulating passage 70. The air containing exhaust gas is introduced into the cylinder 11, and combustion takes place. Since a lowered concentration of oxygen moderates combustion and an increase in combustion temperature is suppressed by an increased concentration of carbon dioxide, the generation of $NO_X$ is suppressed.

In the present embodiment, such suppression of $NO_X$ generation through EGR is also performed when the load acting on the engine 10 increases. When the EGR amount is increased in a period during which the load is increasing, in order to prevent combustion from becoming unstable due to a decrease in temperature caused by EGR, electric current is supplied to the heat generation resistor 21 of the glow plug 20. However, the mere supply of electric current to the glow plug 20 is insufficient, and the temperature of the heat generation resistor 21 must be maintained at a target temperature without fail. Therefore, in the present embodiment, the supply of electric current to the glow plug 20 is performed in accordance with a PI (proportional-integral) control scheme.

Further, calibration (correction) is performed for the correlation between temperature and resistance of the heat generation resistor 21, which correlation is used when the supply of electric current to the glow plug 20 is controlled in accordance with the PI control scheme. Here, the principle of calibration will be described briefly.

Due to various factors, the resistance of the heat generation resistor varies among individual glow plugs, and even glow plugs of the same model number do not necessarily exhibit the same relationship between temperature and resistance. That is, the relationship between temperature and resistance varies among glow plugs of the same model number. However, the relationship between the cumulative amount of supplied power and the amount of generated heat does not depend on the resistance of the heat generation resistor, and the relationship shows a relatively small variation among glow plugs of the same model number. Accordingly, electric current is supplied to a heat generation resistor serving as a reference such that its temperature is saturated at a temperature to be used as a control target (target temperature), and a cumulative amount of power (cumulative electric energy) supplied up to that point is obtained. Through supply of such cumulative electric energy to a heat generation resistor (of a different glow plug) to be calibrated (hereinafter referred to as the "subject heat generation resistor"), the temperature of the subject heat generation resistor can be increased to the target temperature. Therefore, the resistance of the subject heat generation resistor at that time is obtained as a target resistance. When PI control is performed such that the resistance of the subject heat generation resistor becomes equal to the target resistance, the heat generation resistor can be maintained at the target temperature.

In the present embodiment, when electric current is first supplied to the glow plug 20 (at the time of shipment or replacement), the GCU 30 performs calibration of the heat generation resistor 21 to thereby obtain a target resistance in consideration of an individual difference of the heat generation resistor, and stores the target resistance in an unillustrated EEPROM. When the GCU 30 runs an electric current supply control program described below, the GCU 30 reads out the target resistance, and performs the PI control such that the resistance of the heat generation resistor 21 coincides with the target resistance.

Notably, in the present embodiment, when the target resistance is obtained, the target temperature of the heat generation resistor 21 is set to 1200° C. or higher (e.g., 1300° C.). As described above, the $NO_X$ reduction effect can be attained when the temperature of the heat generation resistor 21 is set to 1100° C. or higher; however, Example 1 described below reveals that a more remarkable $NO_X$ reduction effect can be attained when the temperature of the heat generation resistor 21 is set to 1200° C. or higher.

Next, a specific example of electric current supply control which is performed for the glow plug 20 by the GCU 30 will be described in accordance with a flowchart of an electric current supply control program shown in FIG. 2 and with reference to FIG. 1. Notably, each step of the flowchart is abbreviated to "S." At the time of cold start of the engine 10 or immediately after startup, electric current is supplied to the glow plug 20 so as to assist startup or enable stable operation. The electric current supply control program is executed after completing such supply of electric current.

Figure 2:
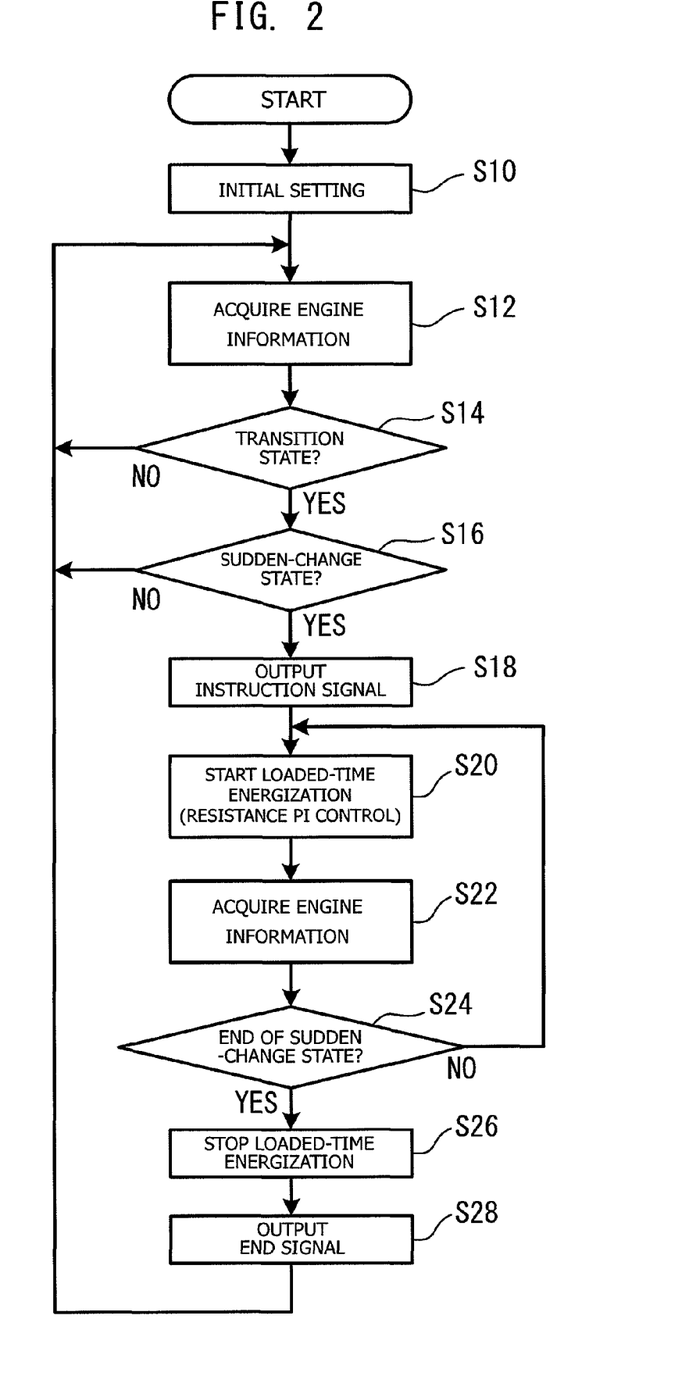
FIG. 2 is a flowchart showing a main routine of an electric current supply control program executed in a GCU 30.

As shown in FIG. 2, when the electric current supply control program is executed, an initial setting is first performed (S10). In this step, a target resistance of the heat generation resistor 21 is read out of the EEPROM (not shown), and stored in the RAM to be used when loaded-time energization (resistance PI control) described below is performed. The target resistance is a resistance which is previously set through the above-described calibration and which corresponds to a target temperature (e.g., 1300° C.) at which the heat generation resistor 21 is to be maintained during the loaded-time energization. Further, an increase (%) of the opening of the EGR throttle 72 described below (i.e., an increase in the EGR amount), which corresponds to the target temperature, is also stored in the EEPROM in advance. The increase in the EGR amount is also read out of the EEPROM, and stored in the RAM.

Next, information regarding the operation state of the engine is acquired (S12). In this processing, information necessary for determining whether or not the operation state of the engine 10 is in a transition state is acquired from the ECU 40, which is connected to the GCU 30 through the CAN. Specifically, information regarding the operation state of the engine 10, such as the degree to which the accelerator pedal has been depressed, engine speed, fuel injection amount and the number of fuel injection steps, is acquired. Notably, the transition state refers to as a state in which the load acting on the engine 10 is changing from a lower level to a higher level. In other words, the transition state refers to a state where the load acting on the engine 10 is increasing; i.e., a transitional period in which the load is increasing, for example, a period in which the load is changing from zero to a low level, or a period in which the load is changing from an intermediate level to a high level.

Then, on the basis of the acquired information, processing is carried out to determine whether or not the engine 10 is in a transition state (S14). Such a determination will not be described in detail, because the details thereof are known. However, an example determination method will be described briefly. For example, the depressed amount of the accelerator pedal (the extent or degree to which the accelerator pedal is depressed) or the engine speed, which is information regarding the operation state of the engine 10, is acquired at predetermined intervals. Several past values of the depressed amount of the accelerator pedal or the engine speed are stored, and a change in the depressed amount of the accelerator pedal or the engine speed with time is obtained through analysis. When the depressed amount of the accelerator pedal or the engine speed greatly increases within a short period of time, the engine 10 is determined to be in a transition state.

When the engine 10 is not in a transition state (S14: NO), the processing returns to S12 so as to acquire new information regarding the operation state of the engine. When the engine 10 is in a transition state (S14: YES), processing determines whether or not the transition state is a sudden-change state (S16). The sudden-change state refers to a state in which the load acting on the engine 10 is in the above-described transition state and is increasing faster than a predetermined changing state. In other words, the sudden-change state refers to a state in which the load acting on the engine 10 is increasing at a speed greater than a predetermined level, rather than a state in which the load acting on the engine 10 is merely increasing. For example, a state where the depressed amount of the accelerator pedal per unit time is greater than a predetermined value (%) or a state where a change (difference) in the engine speed per unit time is greater than a predetermined value can be determined as a sudden-change state. The predetermined value, which serves as a reference, changes depending on the type of information regarding the operation state of the engine. Therefore, the predetermined value is previously set in accordance with the type of information to be acquired, and is stored in the EEPROM.

When the engine 10 is not in a sudden-change state (S16: NO), such as the above-described case, the processing returns to S12, and acquires new information regarding the operation state of the engine. When the engine 10 is in a sudden-change state (S16: YES), an instruction signal is sent to the ECU 40 via the CAN(S18). This instruction signal instructs the ECU 40 to increase the opening of the EGR throttle 72 by an instructed increase amount (%), to thereby increase the ratio of the EGR gas contained in the gas to be introduced into the cylinder. As described above, electric current is supplied to the glow plug 20 and the temperature of the heat generation resistor 21 is maintained at the target temperature (e.g., 1300° C.). Therefore, at the time of load increase, the EGR amount can be increased, without lowering the output of the engine 10. The relationship between the target temperature and amount by which the EGR amount can be increased is previously obtained through an experiment or the like, and an increase amount (%) of the opening of the EGR throttle 72 corresponding to the target temperature is stored in the EEPROM. The instruction signal contains the increase amount (%) of the opening of the EGR throttle 72 stored in the RAM in S10. Notably, the instruction signal corresponds to the "report signal" of the present invention.

In accordance with the received instruction signal, the ECU 40 increases the opening of the EGR throttle 72 by an amount corresponding to the instructed increase amount (%) (in the case where the ECU 40 is set not to perform EGR at the time of load increase, the EGR throttle 72 is opened such that its opening becomes equal to the instructed increase amount (%)). With this operation, an increased amount of exhaust gas is introduced from the exhaust passage 60 into the intake passage 50 via the circulating passage 70, and then introduced into the cylinder 11. Combustion of fuel within the cylinder 11 is slowed (moderated), and an increase in the combustion temperature is suppressed, whereby generation of $NO_X$ is further suppressed.

According to the electric current supply control program, electric current is supplied to the glow plug 20 synchronously with increasing the EGR amount. In the present embodiment, electric current is supplied to the glow plug 20 by means of PI control which changes a duty ratio in accordance with the difference between the resistance of the heat generation resistor 21 and the target resistance such that the resistance of the heat generation resistor 21 approaches the target resistance (S20). Further, information regarding the operation state of the engine is again acquired (S22), and, as in the above-described case, processing determines whether or not the engine 10 is in a transition state (here, a sudden-change state) (S24). If the sudden-change state continues (S24: NO), processing returns to S20 so as to continue the resistance PI control for the heat generation resistor 21.

So long as the transition state (sudden-change state) of the engine 10 continues, the supply of electric current to the glow plug 20 and the operation of increasing the EGR amount are continued. When the engine 10 is determined not to be in a sudden-change state (S24: YES), the supply of electric power to the heat generation resistor 21 is discontinued so as to end the loaded-time energization (S26). Further, an end signal is output to the ECU 40 so as to stop the operation of increasing the EGR amount at the time of load increase (S28). In accordance with the received end signal, the ECU 40 returns the opening of the EGR throttle 72 to the initial opening (in the case where the ECU 40 is set not to perform EGR at the time of load increase, the opening of the EGR throttle 72 is changed to an opening for an ordinary state). The processing then returns to S12 to wait for a next entry into a transition state.

As described above, in the electric current supply control program, when the engine 10 is determined to be in a transition state, an instruction signal is output to the ECU 40 so as to instruct it to increase the EGR amount, and electric current is supplied to the glow plug 20 such that the temperature of the heat generation resistor 21 is maintained at the target temperature. Here, time lags involved in actual operation will be described. When the ECU 40 receives the instruction signal and increases the opening of the EGR throttle 72 by the instructed amount, a time lag occurs before air having an increased exhaust gas content is actually introduced to the cylinder 11, and an $NO_X$ reduction effect begins to appear. Further, a time lag similarly occurs between a point in time when the supply of electric current to the glow plug 20 begins and a point in time when the temperature of the heat generation resistor 21 reaches the target temperature. Meanwhile, a time lag occurs between a point in time when the engine enters a transition state (the load acting on the engine starts to increase) and the engine speed increases and a point in time when the amount of generated $NO_X$ increases. In the present embodiment, as shown in FIG. 1, the circulating passage 70 is provided near the intake valve 51 and the exhaust valve 61 of the cylinder 11. Therefore, a time lag between a point in time when the engine speed increases and a point in time when the $NO_X$ reduction effect appears does not cause any problem in obtaining the effect of the present invention. In order to attain the $NO_X$ reduction effect by supplying electric current to the glow plug 20 while avoiding a reduction in torque, the relationship between the time lags and temperature rising speed of the heat generation resistor 21 is important. However, the means selected for minimizing the above-described time lag depends on the engine itself, the control scheme of the EGR throttle, and the structure and control of the engine, including other auxiliaries. Accordingly, the engine may be configured and controlled such that the above-mentioned time lag becomes zero (in an ideal case), or causes substantially no problem, and no limitation is imposed on specific means for minimizing the time lag.

Here, the engine 10 is assumed to be in an idling state, and a time between a point in time when the supply of electric current to the glow plug 20 is started and a point in time when the temperature of the heat generation resistor 21 reaches the target temperature is represented by Y (sec). However, even when the engine 10 is in an idling state and no electric current is supplied to the glow plug 20, the heat generation resistor 21 receives heat within the cylinder 11. Therefore, the temperature rising time Y of the heat generation resistor 21 is shorter than in the case where the engine 10 is cold-started. Further, a time between a point in time when an operator starts to depress the accelerator pedal to accelerate the engine in the idling state and a point in time when the speed of the engine 10 reaches an engine speed in a full-throttle operation (in the present embodiment, about 3000 rpm) is represented by X (sec). Example 2 described below reveals that the ratio Y/X is desirably set to 0.6 or less in order to effectively suppress generation of $NO_X$. Further, in the case where the target temperature of the heat generation resistor 21 is set to 1200° C., as demonstrated in Example 3 described below, generation of $NO_X$ can be effectively suppressed when $0.5 \leq Y \leq 3.0$ (sec).

The present invention is not limited to the above-described embodiment, and, needless to say, various changes in form and detail of the invention as shown and described above may be made. It is intended that such changes be included within the spirit and scope of the claims appended hereto.

In the present embodiment, the electric current supply control program is executed after completing of the supply of electric current to the glow plug 20 for assisting startup of the engine 10 at the time of cold start and enabling stable operation immediately after startup. However, the electric current supply control program may be executed in parallel with the supply of electric current performed for stable operation immediately after startup. Further, the present electric current supply control program may be integrated with a power supply program for startup assistance and stable operation.

Further, in the present embodiment, the GCU 30 determines whether or not the engine 10 is in a transition state, on the basis of information regarding the operation state of the engine 10, which information is acquired from the ECU 40. However, the embodiment may be modified such that the results of the determination performed in several successive program execution cycles are memorized, and, only when the engine 10 is successively determined to be in a transition state, the engine 10 is determined to be in a transition state. Further, the embodiment may be modified such that the ECU 40 determines whether or not the engine is in a transition state, and the GCU 30 obtains the results of the determination.

Further, the embodiment may be modified to determine an operation (driving) tendency of a driver on the basis of information regarding the operation state of the engine 10 acquired from the ECU 40, and to predict entry into a transition state or a sudden-change state. For example, by recording a relationship between change in the depressed amount of the accelerator pedal and change in the engine speed and analyzing the relationship by a known method, an operation tendency of each driver can be determined. After completing such analysis, a timing can be predicted at which the engine enters a transition state or a sudden-change state, by monitoring changes in the depressed amount of the accelerator pedal. When a state in which the engine 10 is likely to enter a transition state or a sudden-change state is detected, the supply of electric current to the glow plug 20 is started in advance, whereby a reduction of $NO_X$ associated with an increase in the EGR amount can be performed more effectively. Further, the effect of the present invention can be attained sufficiently, even when applied to a glow plug which uses a heat generation resistor whose temperature rising speed is relatively low.

Further, in the present embodiment, when the engine 10 enters a sudden-change state, electric current is supplied to the glow plug 20 and the EGR amount is increased. However, the operation of supplying electric current to the glow plug 20 and increasing the EGR amount may be performed when the engine 10 is in a transition state. In such a case, the target temperature of the heat generation resistor 21 and the increase in EGR amount may be changed between the transition state and the sudden-change state.

As shown in FIG. 1, the intake-exhaust system of the engine 10 includes a single circulating passage 70. However, a second circulating passage may be provided which is connected to the exhaust passage 60 at a position downstream of the turbocharger (the turbine 62 and the compressor 54) and to the intake passage 50 at a position upstream of the turbocharger.

Further, the embodiment may be modified such that the target temperature of the heat generation resistor 21 can be set arbitrarily. The relationship between the target temperature of the heat generation resistor 21 and an amount by which the EGR amount can be increased without lowering the engine output (an increase amount (%) of the opening of the EGR throttle 72) is previously obtained, and is stored in the EEPROM (not shown) of the GCU 30 in the form of a table. The electric current supply control program reads out of the table an EGR amount corresponding to the set target temperature, and incorporates the EGR amount into the instruction signal. Needless to say, the embodiment may be modified such that an amount by which the EGR amount is to be increased at the time of load increase can be set arbitrarily. In this case, the target temperature of the resistor 21 is set with reference to the above-mentioned table.

In the present embodiment, the GCU 30 is taken as an example of the electric current supply control apparatus. However, an electric current supply control apparatus may be provided in the form of an electronic circuit using a chip such as an application-specific integrated circuit (ASIC) or the like, and integrally incorporated the ECU. In such a case, the ECU corresponds to the electric current supply control apparatus, and a circuit within the ECU which performs EGR control corresponds to the external apparatus. In such case, switching elements such as FETs for starting and stopping the supply of electric current to the glow plug are provided separately.

EXAMPLE 1

An evaluation test was performed so as to investigate the relationship between the target temperature of the heat generation resistor and the $NO_X$ reduction effect. In this evaluation test, an engine for testing (a common-rail-type direct injection 3 L engine equipped with a turbocharger) was first operated in an idling state (about 700 rpm), and, after that, the accelerator pedal was fully depressed. When the accelerator pedal is fully depressed, the speed of the engine for testing reaches about 3000 rpm. The engine was operated under each of the following five conditions, and the concentration of $NO_X$ contained in discharged exhaust gas was measured.

Condition 1: No electric current was supplied to the glow plug, and EGR was not performed.

Condition 2: No electric current was supplied to the glow plug, but EGR was performed with the opening of the EGR throttle set to 4.7%.

Condition 3: Electric current was supplied to the glow plug with the target temperature of the heat generation resistor set to 1100° C. Further, the opening of the EGR throttle was adjusted such that the same load as in Condition 2 acted on the engine.

Condition 4: Electric current was supplied to the glow plug with the target temperature of the heat generation resistor set to 1200° C. Further, the opening of the EGR throttle was adjusted such that the same load as in Condition 2 acted on the engine.

Condition 5: Electric current was supplied to the glow plug with the target temperature of the heat generation resistor set to 1300° C. Further, the opening of the EGR throttle was adjusted such that the same load as in Condition 2 acted on the engine.

Figure 3:
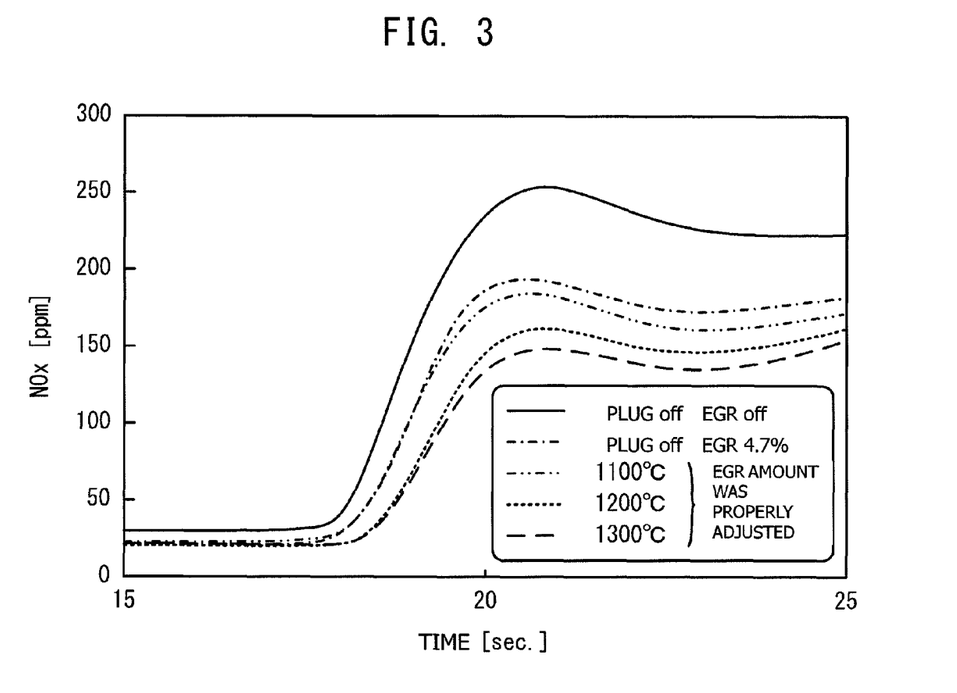
FIG. 3 is a graph showing, for comparison, the amount of $NO_X$ generated when a load acting on an engine increases for cases in which the target temperature of a heat generation resistor is changed while the load acting on the engine is not changed.

FIG. 3 shows the results of the test.

As shown in FIG. 3, in the case (Condition 2) where EGR (4.7%) was performed, the amount of generated $NO_X$ greatly decreased, as compared with the case (Condition 1) where no electric current was supplied to the glow plug, and EGR was not performed. In the cases (Conditions 3 to 5) where electric current was supplied to the glow plug, and the EGR amount was adjusted such that the same load as that in Condition 2 acted on the engine, the EGR amount was able to be increased, whereby the amount of generated $NO_X$ was further reduced. The test reveals that the higher the target temperature of the heat generation resistor, the greater the reduction in the $NO_X$ generation amount. The $NO_X$ generation amounts in Conditions 3 to 5 were compared with that of Condition 2 (reference) in which no electric current was supplied to the glow plug. Through this comparison, it was confirmed that, in Conditions 4 and 5 in which the target temperature was set to 1200° C. or 1300° C., the $NO_X$ generation amount was reduced more remarkably, as compared with Condition 3 in which the target temperature was set to 1100° C. Therefore, the results of the test reveal that, when the target temperature of the heat generation resistor is set to 1200° C., a remarkably enhanced $NO_X$ reduction effect can be attained.

EXAMPLE 2

Next, an evaluation test was carried out so as to investigate the relationship between the temperature rising time of the heat generation resistor of the glow plug (a time required by the heat generation resistor to reach the target temperature from a state where the heat generation resistor is heated to a certain temperature by heat from the engine in an idling state), and an engine speed rising time (a time required by the engine to increase its speed from an idling speed to the maximum engine speed in response to full depression of the accelerator pedal). In this evaluation test, an engine for testing similar to that used in Example 1 was operated in an idling state (in the present example, about 700 rpm). Subsequently, a time between a point in time beginning with full depression of the accelerator pedal, and a point in time when the engine reached its maximum engine speed (an engine speed at the time of full throttle; in the present example, about 3000 rpm) was measured as a time X. This time X changes depending on the load acting on the engine (external load, such as load acting on the engine when the vehicle climbs a hill, or the weight of the vehicle; internal load, such as load acting on the engine due to change in the accelerator pedal depressed amount or the EGR amount; etc.). In view of the above, of the various parameters which influence the load acting on the engine, the EGR amount was changed, with the other parameters being fixed, and, thus, the time X was set to 5 sec.

Figure 4:
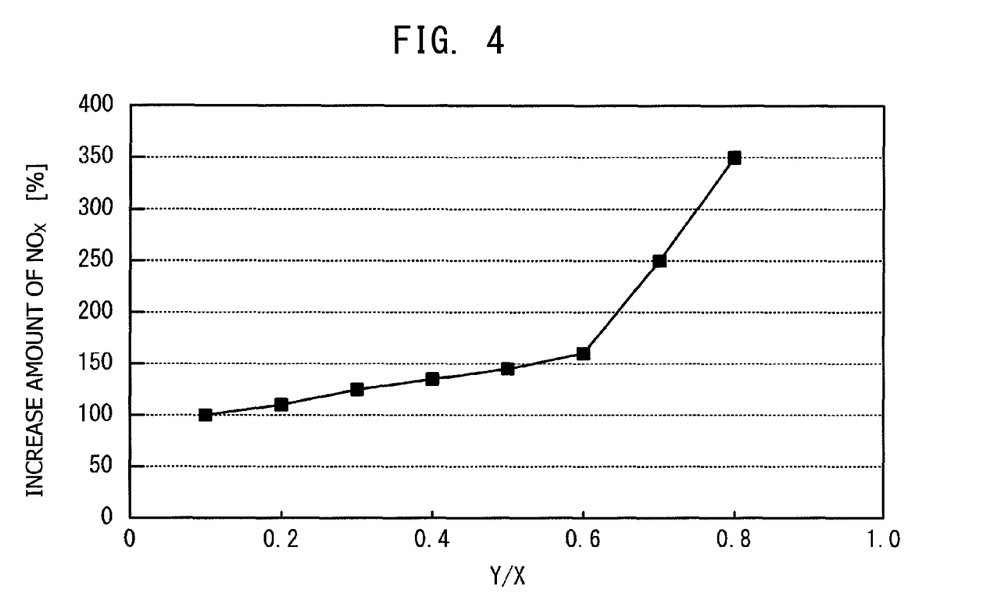
FIG. 4 is a graph showing the relationship between Y/X and $NO_X$ generation amount.

Simultaneously with depressing the accelerator pedal, the supply of electric current to the heat generation resistor was started and adjusted through PWM control such that the time Y required to increase the temperature of the heat generation resistor from its initial temperature (a temperature to which the heat generation resistor is heated by combustion in an idling state and which corresponds to the "first temperature" in the present invention) to the target temperature (which corresponds to the "second temperature" in the present invention; in the present test, 1300° C.) became 0.5 sec. After the temperature of the heat generation resistor reached the target temperature, the temperature was maintained at the target temperature. The ratio Y/X at that time was 0.1. Further, simultaneously with the supply of electric current, the opening of the EGR throttle was adjusted to increase the EGR amount such that the time X became 5 sec. In such a state, the concentration of $NO_X$ contained in exhaust gas discharged in a time between the point in time beginning with full depression of the accelerator pedal and the point in time when the engine reached its maximum engine speed was measured. Similarly, the time Y was changed in 0.5 sec steps within a range of 1.0 to 4.0 sec, and the increase in the EGR amount was adjusted such that the time X became 5 sec. In each state (under each condition), the concentration of $NO_X$ contained in exhaust gas was measured. Through this test, the $NO_X$ concentration was obtained for eight states (conditions) which were created by changing the ratio Y/X in 0.1 sec increments within the range of 0.1 to 0.8. The $NO_X$ concentration in the state where the ratio Y/X was 0.1 was regarded as 100%, and the relative increase (%) in $NO_X$ concentration was obtained for the cases where the ratio Y/X was 0.2 to 0.8. FIG. 4 shows the results of this test.

As shown in FIG. 4, a tendency was observed in that the greater the ratio Y/X, the greater the amount by which the $NO_X$ concentration increases. When the ratio Y/X was 0.6 or less, the amount of increase in $NO_X$ concentration was suppressed to 160% or less. However, when the ratio Y/X was 0.7, the increase amount was 250%, and, when the ratio Y/X was 0.8, the increase amount was 350%. That is, in these cases, the degree of increase was large as compared with the case where the ratio Y/X was 0.1 to 0.6. The present inventors found that the smaller the ratio Y/X, the greater the speed at which the temperature of the glow plug can be raised to 1300° C., and, as a result, the EGR amount can be increased, without increasing the load acting on the engine. Further, from FIG. 4, the present inventors found that, when the ratio Y/X is 0.6 or less, generation of $NO_X$ can be effectively suppressed. That is, when the ratio Y/X is set to 0.6 or less, the temperature rising speed of the heat generation resistor and the rising speed of the engine speed can be well balanced, whereby generation of $NO_X$ can be sufficiently suppressed.

EXAMPLE 3

Figure 5:
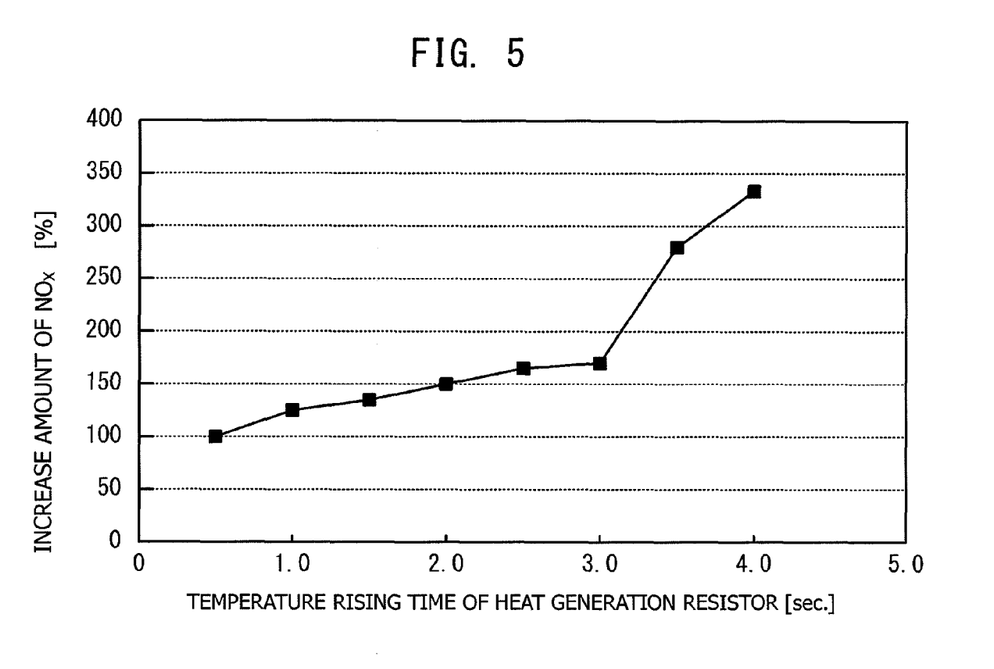
FIG. 5 is a graph showing the relation between the temperature rising time of the heat generation resistor of the glow plug and $NO_X$ generation amount.

Another evaluation test was performed in order to confirm a desired temperature rising time of the heat generation resistor of the glow plug. In this evaluation test, a test similar to that performed in Example 2 was performed with the target temperature of the glow plug set to 1200° C. Specifically, an engine for testing similar to that used in Example 1 was operated in an idling state (in the present example, about 700 rpm). The accelerator pedal was fully depressed, and the concentration of $NO_X$ contained in exhaust gas discharged until the engine reached its maximum engine speed (in the present example, about 3000 rpm) was measured. This concentration measurement was performed for eight states (conditions) created by changing the temperature rising time of the heat generation resistor to 1200° C. in 0.5 sec increments within the range of 0.5 sec to 4.0 sec. The EGR amount was adjusted in the same manner as in Example 2; that is, the opening of the EGR throttle was adjusted such that the rising time of the engine speed became the same among the eight states. The $NO_X$ concentration in the state where the temperature rising time of the heat generation resistor to 1200° C. was 0.5 sec was taken as 100%, and the relative increase amount (%) of the $NO_X$ concentration was obtained for the states where the temperature rising time was 1.0 to 4.0 sec. FIG. 5 shows the results of this test.

As shown in FIG. 5, a tendency was observed in that the longer the temperature rising time of the heat generation resistor, the greater the amount by which the $NO_X$ concentration increases. When the temperature rising time was 3.0 sec or less, the increase amount in $NO_X$ concentration was suppressed to 170% or less. However, when the temperature rising time was 3.5 sec, the increase amount of the $NO_X$ concentration was 280%, and, when the temperature rising time was 4.0 sec, the increase amount was 333%. That is, in these cases, the degree of increase was large as compared with the case where the temperature rising time was 0.5 to 3.0 sec. The present inventors found that, when the temperature of the glow plug can be quickly increased to 1200° C., the load acting on the engine can be suppressed even if the EGR amount is increased. Further, from FIG. 5, the present inventors found that, when the temperature rising time was 3.0 sec or shorter, generation of $NO_X$ can be effectively suppressed. The temperature rising time is desirably shortened as much as possible. However, in order to make the temperature rising time shorter than 0.5 sec, it is necessary to develop a heat generation resistor which allows for quick temperature raising through an increase in the amount of electric power supplied to the heat generation resistor per unit time and/or by employing an expensive material, which may result in an increase in production cost.

This application is based on Japanese Patent Application No. 2009-117811 filed May 14, 2009, incorporated herein by reference in its entirety.

The invention claimed is:

1. An electric current supply control apparatus for a glow plug, the electric current supply control apparatus being connected to an external apparatus which controls a circulation valve provided in a circulating passage connecting an intake passage and an exhaust passage of an engine so as to adjust an amount of exhaust gas circulated to the intake side, the circulated exhaust gas being a portion of exhaust gas discharged from the engine, and the electric current supply control apparatus being adapted to control supply of electric current to a heat generation resistor of the glow plug mounted to the engine, said apparatus comprising:

transition determination means, operable after startup of the engine, for determining whether or not a load acting on the engine is in a transition state in which the load is increasing based on information obtained from the external apparatus and regarding an operation state of the engine;

electric current supply means for supplying electric current to the heat generation resistor when the load acting on the engine is determined to be in the transition state; and output means for outputting to the external apparatus, synchronously with the supply of electric current to the heat generation resistor, a report signal which reports that the circulating amount of the exhaust gas can be increased.

2. The electric current supply control apparatus for a glow plug according to claim 1, further comprising acquisition means for acquiring a resistance of the heat generation resistor when the electric current supply means supplies electric current to the heat generation resistor, wherein the electric current supply means controls the amount of electric current supplied to the heat generation resistor such that the acquired resistance coincides with a target resistance corresponding to a temperature to which the temperature of the heat generation resistor is to rise.

3. The electric current supply control apparatus for a glow plug according to claim 2, wherein the report signal contains information regarding an increase in the circulating amount, which increase corresponds to the temperature to which the temperature of the heat generation resistor is to rise.

4. The electric current supply control apparatus for a glow plug according to claim 1, further comprising sudden-change determination means, operable when the load acting on the engine is in the transition state, for determining whether or not the load acting on the engine is in a sudden-change state in which the load acting on the engine increases at a speed greater than a predetermined speed, wherein the supply of electric current to the heat generation resistor by the electric current supply means and the output of the report signal by the output means are performed, when the load acting on the engine is determined to be in the sudden-change state.

5. The electric current supply control apparatus for a glow plug according to claim 1, wherein the electric current supply means supplies electric current to the heat generation resistor such that the temperature of the heat generation resistor becomes 1200° C. or higher.

6. A glow plug and electric current supply control apparatus as claimed in claim 1 connected to the glow plug, the energization state of the glow plug being controlled by the electric current supply control apparatus, wherein a relationship $Y/X \leq 0.6$ is satisfied, where X represents a time required by the engine to increase its speed from a first engine speed at the time of idling to a second engine speed greater than the first engine speed, and Y represents a time required by the heat generation resistor to increase its temperature from a first temperature, to which the heat generation resistor is heated by heat received from the engine when the engine is in an idling state and no electric current is supplied to the heat generation resistor, to a second temperature which is higher than the first temperature and to which the heat generation resistor is to rise.

7. The glow plug and electric current supply control apparatus according to claim 6, wherein, when the second temperature of the heat generation resistor is set to 1200° C., a relationship $0.5 \leq Y \leq 3.0$ (sec) is satisfied.

* * * * *